United States Patent [19]

Houghton

[11] 4,079,084
[45] Mar. 14, 1978

[54] FLUOROCARBON SURFACTANTS

[75] Inventor: Leonard Eric Houghton, Runcorn, England

[73] Assignee: Imperial Chemical Industries Limited, London, England

[21] Appl. No.: 491,621

[22] Filed: Jul. 25, 1974

Related U.S. Application Data

[63] Continuation of Ser. No. 235,068, Mar. 15, 1972, abandoned.

[51] Int. Cl.$^2$ ............................... C07C 43/00; C07C 43/10
[52] U.S. Cl. ................................... 260/615 BF; 106/3; 260/453 R; 260/456 F; 260/556 F; 260/556 AR; 560/179; 560/180
[58] Field of Search .......... 260/615 BF, 615 F, 614 F

[56] References Cited

U.S. PATENT DOCUMENTS

| | | | |
|---|---|---|---|
| 2,409,274 | 10/1946 | Hanford et al. | 260/615 F |
| 2,782,240 | 2/1957 | Hefner et al. | 260/613 |
| 2,872,432 | 2/1959 | Metzger | 260/615 X |

FOREIGN PATENT DOCUMENTS

| | | | |
|---|---|---|---|
| 1,130,822 | 10/1968 | United Kingdom | 260/615 F |
| 583,874 | 1/1947 | United Kingdom | 260/615 F |

*Primary Examiner*—Howard T. Mars
*Attorney, Agent, or Firm*—Cushman, Darby & Cushman

[57] ABSTRACT

Novel fluorocarbon surfactants containing a non-ionic hydrophilic chain (preferably an oxyethylene chain) and at least two terminal perfluorocarbon groups of at least three carbon atoms, preferably branched perfluorocarbon groups derived from an oligomer of tetrafluoroethylene.

10 Claims, No Drawings

FLUOROCARBON SURFACTANTS

This is a continuation, of application Ser. No. 235,068, filed Mar. 15, 1972 now abandoned.

This invention relates to non-ionic surface-active compounds containing fluorocarbon groups.

According to the present invention we provide a non-ionic surface-active compound comprising a chain of repeating non-ionic hydrophilic units and at least two terminal perfluorocarbon groups of at least three carbon atoms.

Each terminal perfluorocarbon group may be the same or different and is preferably on opposite ends of the non-ionic hydrophilic chain.

The chain of non-ionic repeating units may be for example oxyalkylidine, oxymethylene, oxyalkylene

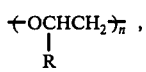

imino alkylene

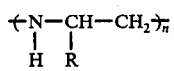

or secondary amido chains

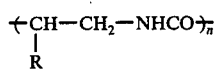

where R may be H or short alkyl.

The chain is preferably a flexible chain containing an ether group and thus an oxyalkylene chain is the preferred form.

The hydrophilic chain especially preferred is an oxyethylene chain containing the repeating unit $-(CH_2CH_2O)_n-$ which may be derived from a corresponding polyethylene glycol or low molecular weight polymer of ethylene oxide.

Fluorocarbon groups may be directly linked to the hydrophilic groups or there may be other intervening organic bifunctional groups, for example phenylene, amino, or alkylene groups.

Thus a preferred form of the invention may be represented by the structure

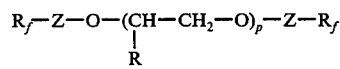

where
- R is H, $CH_3$ or $C_2H_5$
- $R_1$ is a perfluoroalkyl or alkenyl group containing from three to twenty carbon atoms, preferably six to twelve carbon atoms
- Z is a divalent organic radical, preferably a radical selected from $-CO-$, $-SO_2-$, $-CH_2CH_2-$, $-CH_2CO-$, $-OC_6H_4CH_2-$, $-C_6H_4CO-$, $-C_6H_4SO_2-$, $CONH(CH_2)_nNHCO$ (where $n$ is an integer from 1 to 6) and $-SO_2N(R)CH_2CH_2-$ (where R is H, $CH_3$ or $C_2H_5$)
- $p$ is a number from 2 to 100, preferably 5 to 30.

Each $-Z-$ and each $R_f$ may be the same or different but preferably for convenience of preparation is the same group, the compound being made by reaction of appropriate groups with each hydroxyl end of a polyethylene oxide chain.

The organic hydroxyl group may be alcoholic or phenolic in character and thus the bridging group Z may contain aliphatic and/or aromatic groups.

In the case wherein the organic hydroxyl group is a terminal hydroxyl group of an oxyalkylene chain the product is the especially preferred form of the invention, i.e. a compound having the formula

in which
- $R_f$ is a residue of a perfluoroolefine, e.g. a tetrafluoroethylene oligomer after a fluorine atom is abstracted
- $p$ is a number from 2 to 100.

The nucleophilic reaction between an oligomer of tetrafluoroethylene and a hydroxyl-terminated polyethylene oxide molecule in the presence of a proton acceptor has been described in our U.K. Patent Specification No. 1,130,822.

A preferred form of proton acceptor is a basic compound, for example a hydride or hydroxide of an alkali metal or a salt of a weak acid and a strong base for example carbonates, silicates or phosphates of sodium or potassium as described in our co-pending U.K. Patent Application No. 48145/71.

The branched perfluorocarbon group of at least three carbon atoms may be either the whole or part only of the fluorocarbon portion of the molecule and groups containing hydrogen atoms may be intervening between the said terminal perfluorocarbon group and the hydrophilic part of the molecule. Thus the perfluorocarbon may be a branched perfluoroalkyl or perfluoroalkenyl group, or may be a terminal part of a highly fluorinated branched or straight chain group which may be saturated or unsaturated.

The terminal aliphatic perfluorocarbon group of at least three carbon atoms may be a perfluoro-iso-propyl or perfluoro-tertiary-butyl group, but it is preferably a group containing a terminal chain of at least three carbon atoms, for example a terminal portion of a straight perfluoroalkyl chain $CF_3(CF_2)_n$ or a terminal portion of either branched perfluoroalkenyl or perfluoroalkyl group of which the following are preferred examples:

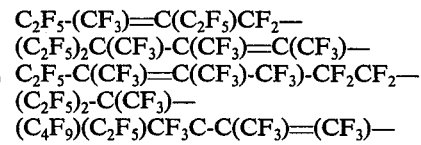

The fluorocarbon group is preferably derived from an oligomer of tetrafluoroethylene or hexafluoropropene. These oligomers are highly-branched perfluoroolefines and reactions have been described in our Patent Specification No. 1,130,822 and also in Dutch Applications 6,900,538 (U.K. Application 21584/69) whereby the oligomer may be directly joined by an ether linkage to the oxygen atom of an organic hydroxyl group.

The perfluorocarbon group may be derived in many different ways, for example by direct fluorination of a hydrocarbon or chlorinated hydrocarbon, but we prefer to derive the group from a branched oligomer of hexafluoro propene of tetrafluoroethylene. The latter is especially preferred because the range of oligomers conveniently produced having from 6 to 14 carbon atoms provides the range of sizes of fluorocarbon group preferred for the surface-active agents of this invention. From tetrafluoroethylene pentamer for example the branched perfluoroalkyl residue $C_6F_{13}$ or alternatively the branched perfluoroalkenyl group $C_{10}F_{19}$ may be produced. In our U.K. Patent Specifications No. 1,130,822 and 1,176,492 reactions of the said oligomers are described which may be used to prepare suitable surface active agents for this invention. In our U.K. Patent Application No. 8295/71 the preparation of some compounds within this invention is described, having as non-ionic hydrophilic portions, polyoxyethylene chains. In the latter specification it is demonstrated that surface-active compounds may be made having two or more terminal perfluorocarbon groups joined by oxyaromatic groups to a hydrophilic group. Compounds possessing a polyoxyethylene group, for example having from 5 to 50, preferably from 8 to 30 oxyethylene units, and two terminal branched perfluorocarbon groups, for example from 6 to 12 carbon atoms (preferably 8 or 10 carbon atoms), are especially preferred compounds.

Surface-active compounds accordingly to the invention include the following:

$R_fO(CH_2CH_2O)_pR_f$
$R_fO[CH(CH_3)CH_2O]_pR_f$
$R_fOC_6H_4SO_2O(CH_2CH_2O)_pSO_2C_6H_4OR_f$
$R_fOC_6H_4CH_2O(CH_2CH_2O)_pR_f$
$R_fOC_6H_4CH_2O(CH_2CH_2O)_pOCH_2C_6H_4OR_f$
$R_fOC_6H_4SO_2O(CH_2CH_2O)_pR_f$ where each
$R_f$ (which may be the same or different) is a branched perfluoroalkenyl group, $C_nF_{2n-1}$, e.g. $C_8F_{15}$, $C_{10}F_{19}$, $C_{12}F_{23}$, preferably derived from an oligomer of tetrafluoroethylene
$p$ is an integer from 5 to 50, preferably 8 to 30
and also include

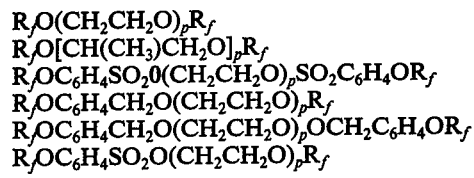

Alternatively fluorocarbon compounds other than oligomers of tetrafluoroethylene may be used especially when short or straight fluorocarbon chains are required. Consequently alcohols and alkali metal derivatives of alcohols, carboxylic acids, sulphonic acids and amines containing perfluorocarbon groups may be reacted with a derivative of a polyalkylene oxide, preferably a chloroformate derivative. Thus compounds which include

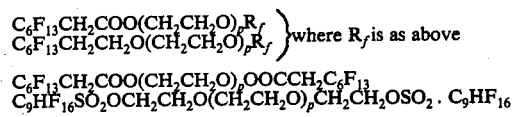

provide useful products which are examples of the present invention when reacted with, for example

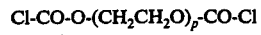

wherein
$p$ is a number from 2 to 100, preferably 5 to 30.

In addition acids, for example perfluorocarboxylic acids and sulphonic acids, are usually converted to their acid halides in order to react with polyalkyleneoxide compounds. For example $C_7F_{11}$-COCl or $C_8F_{17}SO_2Cl$ and $HO(CH_2CH_2O)_pH$ may be reacted to give products which are further examples of the present invention, i.e.

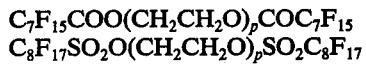

Each of the two perfluoro groups may differ in their basic structure, for example a compound having a straight chain perfluoroalkyl group at one end and a highly branched perfluoroalkenyl group at the other end. This structure has advantageous properties when a combination of the characteristics of different perfluoro groups is required, for example the close packing afforded by the straight chain groups and the broader coverage obtainable from highly branched groups. Compounds of the above type may be made by reacting a tetrafluoroethylene oligomer with a hydroxyl terminated non-ionic surfactant containing a perfluoroalkyl group, e.g.

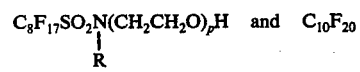

react in the presence of
sodium carbonate to give

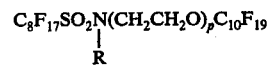

The compounds of the present invention are useful in many coating applications, for example water-based paints, polishes or other protective and decorative coatings, where a high gloss finish is desired, especially in quick-drying coatings which are required to shine without subsequent buffing. The fluorocarbon surfactants improve the "self-levelling" property of the formulation whereby the uniformity of the surface film is considerably improved. Polish formulations containing the especially preferred surfactants, those having a polyoxyethylene chain terminated at each end by groups containing branched perfluorocarbon groups derived from tetrafluoroethylene oligomers, may be shown to produce a high gloss especially notable on vertical surfaces.

The invention is illustrated but in no way limited by the following Examples:

EXAMPLE 1

A conventional polish formulation was prepared consisting of the following components:
Carnauba wax: 72 g
Oleic acid: 9 ml
Triethanolamine: 10.6 ml
Borax: 5.4 g
Shellac: 60 g
28% Ammonia solution: 1.75 ml
Distilled water: 600 ml The total composition was emulsified to a uniform and stable mixture and which when applied as a uniform coating to a surface dried to give a shiny surface.

The surface-active agent of formula $C_{10}F_{19}O(CH_2CH_2C_{10}F_{10}O(CH_2CH_2O)_{23}C_{10}F_{19}$ — the $C_{10}F_{19}$ groups being branched perfluoroalkenyl groups derived from tetrafluoroethylene pentamer — was prepared as a 5% solution in water. This solution was added to the polish formulation above to give a concentration of fluorocarbon compound of 0.005% by weight of the total. After the fluorocarbon compound has been intimately mixed uniform coatings of the polish formulations with and without the fluorocarbon surfactant were applied each to one half of the surface of a thermoplastic floor tile and the appearance examined after a period of one hour for drying. The half of the tilesurface coated with the polish formulation containing fluorocarbon surfactant dried to give a brighter and glossier surface demonstrating a superior "levelling" effect on the surface of the coating during drying imparted by the surfactant $C_{10}F_{19}O(CH_2CH_2O)_{23}C_{10}F_{19}$.

EXAMPLE 2

Seven formulations differing only on the nature of the fluorochemical surfactant used were prepared according to the procedure given below:

A. 27 g of a 40% solid content dispersion of an acrylate/acrylonitrile copolymer was diluted with 450 ml of water.

B. Consisted of 12 g of a 15% solids content low polyethylene wax aqueous emulsion.

C. Consisted of 16 g of 15% Shanco 334 resin solution (obtained from Shanco Plastics).

Parts B and C were added to the stirred dispersion A followed by 0.35 g of tributoxyethyl phosphate. This mixture was stirred for 30 minutes after which time 1.5 g carbitol and 0.15 g 37% formaldehyde solution and 0.5 g of a 1% solution of the fluorochemical surfactant were added. The final pH of the mixture was adjusted to 9.0 using ammonium hydroxide to give formulation 0.

The following fluorochemical surfactants were incorporated into this formulation 0:

1. FC.128 ⎫ Commercially available straight chain
2. FC.134 ⎬ perfluoroalkyl containing surfactants
3. FC.170 ⎭ supplied by 3M's company
4. $C_{10}F_{19}O(CH_2CH_2O)_8CH_3$
5. $C_{10}F_{19}O(CH_2CH_2O)_{17}CH_3$
6. $C_{10}F_{19}O(CH_2CH_2O)_{13}C_{10}F_{19}$
7. $C_{10}F_{19}O(CH_2CH_2O)_{23}C_{10}F_{19}$ Whilst each of the formulations 1 to 7 gave improved "shine" when spread on a horizontal surface compared with the same polish formulation, without a fluorochemical surfactant (formulation 0) only 6 and 7 produced a noticeably superior shine when they were all applied to an inclined surface.

Each of the formulations 1 to 7 was applied with a muslin cloth onto separate portions of simulated car panel held vertically and allowed to dry. Only those formulations containing the bispentamer substituted derivatives, i.e. 6 and 7, produced a noticeably good shine: with the others, considerable streaking on the surface was apparent when they had dried.

EXAMPLE 3

Sodium hydride (182 g of a 60% dispersion in mineral oil) was freed from mineral oil by three consecutive washings with toluene (3 × 100 ml) and transferred to a 10 liter reaction vessel containing pentamer (2.15 kg) and toluene (5 liter). To this vigorous stirred mixture a toluene solution of polyethylene glycol ("Carbowax") molecular weight 1000 (2 kg) in toluene (3 liter) was added dropwise at such a rate that controlled effervescence of the mixture occurred. After complete addition of the "Carbowax" solution the mixture was stirred at 70° C for 6 to 7 hours, allowed to cool and filtered to remove any sodium fluoride. Removal of the toluene in vacuo left a pale yellow oil (3.58 kg) which solidified on cooling. Aqueous solutions of this compound had the following surface tension values at 25° C.

|  | Surface tension dynes/cm |
|---|---|
| 1% | 24.1 |
| 0.1% | 25.3 |
| 0.01% | 26.7 |
| 0.001% | 34.3 |
| 0.0001% | 41.2 |

The compound was found to have a structure corresponding to $C_{10}F_{19}O(CH_2CH_2O)_{23}C_{10}F_{19}$ and is the fluorochemical surfactant No. 7 referred to in Example 3.

The fluorochemical surfactant No. 6 in Example 3 may be made by a similar process using a lower molecular weight sample of polyethylene glycol.

The compounds 4 and 5 used in Example 3 above were made by the reaction of tetrafluoroethylene pentamer with the sodium derivative of the appropriate polyethylene glycol as described in Examples 9 and 10 of our U.K. Patent Specification No. 1,130,882.

EXAMPLE 4

To a stirred mixture of the tetrafluoroethylene tetramer (0.81 Kg, 2.01 m), anhydrous potassium carbonate (0.28 Kg. 2.0 m) in acetone (0.5 liter) was added dropwise to a solution of polyethylene glycol molecular weight 1,000 (1 Kg, 1 m) in acetone (1.5 liter). Upon complete addition the mixture was refluxed with stirring for four hours. The mixture was allowed to cool, filtered and solvent evaporated in vacuo to yield 1.7 Kg of a low melting pale yellow wax having a melting point of 38° C to 40° C formulated as $C_8F_{15}O(CH_2CH_2O)_{23}C_8F_{15}$. The product was characterised by infra-red and fluorine nuclear magnetic resonance spectroscopic measurements. Infra-red showed the absence of an OH absorption which demonstrated that all the glycol had reacted and the presence of C-F peaks from the perfluorocarbon portion. The nuclear magnetic resonance spectrum was identified as that of the tetramer of tetrafluoroethylene with one fluorine atom removed. Characteristic infra-red absorption peaks were observed at 2860 cm$^{-1}$ for C-H absorption
1235 and 1200 cm$^{-1}$ for C-F absorption
1142 and 1110 cm$^{-1}$ for C-O absorption The same method was utilised to prepare various tetramer, pentamer and hexamer derivatives. The surface tensions of aqueous solutions of these compounds are given in Table 1:

Table 1

| Compound | Surface tension in dynes/cm % by weight | | | |
|---|---|---|---|---|
|  | 1% | 0.1% | 0.01% | 0.001% |
| $C_8F_{15}O(CH_2CH_2O)_{23}C_8F_{15}$ | 24.2 | 24.2 | 25.9 | 41.6 |
| $C_{10}F_{19}O(CH_2CH_2O)_7C_{10}F_{19}$ | 23.7 | 24.4 | 24.6 | 41.5 |
| $C_{10}F_{19}O(CH_2CH_2O)_{13}C_{10}F_{19}$ | 25.5 | 27.5 | 32.0 | 42.9 |
| $C_{10}F_{19}O(CH_2CH_2O)_{23}C_{10}F_{19}$ | 24.1 | 25.3 | 26.7 | 34.3 |
| $C_{10}F_{19}O(CH_2CH_2O)_{90}C_{10}F_{19}$ | 29.7 | 33.1 | 42.6 | 52.7 |

Table 1-continued

| | Surface tension in dynes/cm | | | |
|---|---|---|---|---|
| | | % by weight | | |
| Compound | 1% | 0.1% | 0.01% | 0.001% |
| $C_{12}F_{23}O(CH_2CH_2O)_{23}C_{12}F_{23}$ | 26.6 | 28.3 | 33.9 | 46.0 |

EXAMPLE 5

A solution of polyethylene glycol molecular weight 1,000 (25 g) in toluene (50 ml) was added dropwise to a stirred suspension of sodium hydride (2.55 g) in toluene (25 ml) at 25° C. to the disodium salt thus formed, a toluene (50 ml) solution of the sulphonyl chloride $C_{10}F_{19}OC_6H_4SO_2Cl$ (35 g) was introduced dropwise. Stirring at 25° C was continued for 3 hours after which time the solution was filtered and toluene removed in vacuo leaving 57 g of a pale yellow wax having a melting point of 40° C to 44° C.

Infra-red spectral peaks were observed at 2860 cm$^{-1}$ (C-H), 1237, 1195 cm$^{-1}$ (C-F), 1142 and 1112 cm$^{-1}$ (C-O). Aqueous solutions of this compound had surface tension values of 28.0, 30.1, 36.4 and 40.9 dynes/cm at 1%, 0.1%, 0.01% and 0.001% concentration respectively.

The compound was formulated as $$C_{10}F_{19}OC_6H_4SO_2O(CH_2CH_2O)_{23}SO_2C_6H_4OC_{10}F_{19}$$

EXAMPLE 6

A solution of perfluoro octanoyl chloride and HCl (47.5 g) in toluene (200 ml) was added dropwise to a stirred solution of polyethylene glycol of molecular weight 1000 (50 g) in toluene (50 ml) during one hour. The solution was stirred an additional two hours and evaporated in vacuo to yield the product as a pale yellow wax of melting point 40° C to 42° C and giving infra-red spectroscopic peaks at 2860 (C-H), 1750 (O-C-O), 1240 and 1205 (C-F), 1142 and 1122 (C-O) cm$^{-1}$.

The compound was formulated as $$C_7F_{15}CO\text{-}O(CH_2CH_2O)_{23}COC_7F_{15}$$

Surface tension measurements were obtained of an aqueous solution of the product $C_7F_{15}COO(CH_2CH_2O)_{23}COC_7F_{15}$

| Concentration by weight | 1% | 0.1% | 0.01% | 0.001% |
|---|---|---|---|---|
| Surface tension in dynes/cm | 20.7 | 26.0 | 44.8 | 55.7 |

We claim:

1. A compound having the formula $$R_fO(CH_2CH_2O)_pR_f$$

wherein each
$R_f$ may be the same or different and is a perfluoroalkenyl group containing from three to twenty carbon atoms, and
p is a number from 2 to 100.

2. A compound as claimed in claim 1 wherein each group $R_f$ is the perfluoroolefine residue of a perfluorolefine after a fluorine atom is abstracted therefrom.

3. A compound as claimed in claim 1 wherein the group $R_f$ contains from six to twelve carbon atoms.

4. A compound as claimed in claim 1 wherein the $R_f$ group is selected from the group consisting of $C_8F_{15}$, $C_{10}F_{19}$ and $C_{12}F_{23}$ and $C_6F_{13}$.

5. A compound as claimed in claim 1 wherein p is a number from 5 to 30.

6. A compound as claimed in claim 1 wherein $R_f$ is derived from an oligomer of tetrafluoroethylene or hexafluoropropene.

7. A compound according to claim 1 wherein $R_f$ is selected from the group:

$$C_2F_5\text{-}C(CF_3)\!=\!C(C_2F_5)CF_2\text{—},$$

$$(C_2F_5)_2C(CF_3)\text{-}C(CF_3)\!=\!C(CF_3)\text{—},$$

$$C_2F_5\text{-}C(CF_3)\!=\!C(CF_3)\text{-}CF_2CF_2\text{—, and}$$

$$(C_4F_9)(C_2F_5)CF_3C\text{-}C(CF_3)\!=\!C(CF_3)\text{—}.$$

8. A compound as claimed in claim 1 wherein $R_f$ is an unsaturated straight or branched chain group.

9. A compound as claimed in claim 1 wherein $R_f$ is an unaturated branched group.

10. A compound having the formula:

$$R_f\text{—O—}(\underset{\underset{R}{|}}{CH}\text{—}CH_2\text{—O})_p\text{—}R_f$$

where
R is H;
$R_f$ is a perfluoroalkenyl group containing from three to twenty carbon atoms;
p is a number from 2 to 100; and each $R_f$ is the same.

* * * * *